(12) United States Patent
North (10) Patent No.: US 6,902,185 B2
(45) Date of Patent: Jun. 7, 2005

(54) PASSENGER AIRBAG COVER

(75) Inventor: Todd M. North, Vandalia, OH (US)

(73) Assignee: Delphi Technologies, Inc., Troy, MI (US)

(*) Notice: Subject to any disclaimer, the term of this patent is extended or adjusted under 35 U.S.C. 154(b) by 93 days.

(21) Appl. No.: 10/352,282

(22) Filed: Jan. 27, 2003

(65) Prior Publication Data

US 2004/0145164 A1 Jul. 29, 2004

(51) Int. Cl.$^7$ .............................................. B60R 21/20
(52) U.S. Cl. ................................. 280/728.3; 280/732
(58) Field of Search .............................. 280/728.3, 732, 280/728.2, 730.1, 752

(56) References Cited

U.S. PATENT DOCUMENTS

| | | | | |
|---|---|---|---|---|
| 5,312,129 A | * | 5/1994 | Ogawa .................... | 280/728.2 |
| 5,333,901 A | | 8/1994 | Barnes ....................... | 280/732 |
| 5,364,124 A | | 11/1994 | Donegan et al. ......... | 280/730 R |
| 5,398,959 A | | 3/1995 | Avila ...................... | 280/728 B |
| 5,482,313 A | * | 1/1996 | Ikeya et al. .............. | 280/728.3 |
| 5,588,669 A | * | 12/1996 | Leonard et al. .......... | 280/728.3 |
| 5,603,524 A | | 2/1997 | Barnes et al. ............. | 280/728.2 |
| RE36,167 E | | 3/1999 | Barnes ....................... | 280/732 |
| 6,045,153 A | | 4/2000 | Sommer et al. .......... | 280/728.3 |
| 6,082,765 A | * | 7/2000 | Bowers et al. ........... | 280/728.2 |
| 6,152,480 A | * | 11/2000 | Iwanaga .................. | 280/728.3 |
| 6,247,722 B1 | | 6/2001 | Brodi, Jr. et al. | |
| 6,382,660 B1 | | 5/2002 | Starner et al. | |
| 6,422,589 B1 | | 7/2002 | Ostermann et al. | |
| 6,460,874 B1 | * | 10/2002 | McDonnell et al. ..... | 280/728.3 |
| 6,485,050 B1 | | 11/2002 | Simon et al. | |
| 6,502,852 B2 | | 1/2003 | Kassman et al. | |
| 6,533,314 B2 | | 3/2003 | Merrifield et al. | |

FOREIGN PATENT DOCUMENTS

| | | | | | |
|---|---|---|---|---|---|
| JP | 2001001856 A | * | 1/2001 | ........... | B60R/21/20 |
| JP | 2001163153 A | * | 6/2001 | ........... | B60R/21/20 |

* cited by examiner

*Primary Examiner*—Peter C. English
(74) *Attorney, Agent, or Firm*—Scott A. McBain (57) ABSTRACT

A vehicle airbag system and method of removably securing the same is disclosed. The method and system include an instrument panel disposed within a passenger compartment of the vehicle having an opening to receive an airbag module and a cover removably secured thereto. The cover is configured to cover the opening and to flushly mount with a surface defining the instrument panel. A chute extends from a bottom surface of the cover and is configured to operably connect with the airbag module. A securement feature extends from one side wall defining the chute and is configured to slidingly engage one edge defining the opening of the instrument panel to mechanically wedge the one edge between the bottom surface of the cover and the securement feature. A plurality of apertures are configured in an opposite side of the cover that are configured to receive a mechanical fastener therethrough to secure the opposite side of the cover to the instrument panel.

16 Claims, 6 Drawing Sheets

FIG. 7 ized passenger airbag cover arrangement allows for a good fit between the cover and instrument panel without increasing the size of the cover.

PASSENGER AIRBAG COVER

TECHNICAL FIELD

This disclosure relates generally to airbag modules. More specifically, this disclosure relates to a cover arrangement for an airbag module.

BACKGROUND

As more and more vehicles are equipped with supplemental inflatable restraint (SIR) systems, other vehicle components have been modified to accommodate the use of such systems. For example, most passenger side SIR systems are disposed within and behind an instrument panel, which extends across the width of a vehicle compartment. During assembly, a conventional instrument panel in a vehicle having a passenger side SIR system requires a discrete door which covers an opening formed in the instrument panel for the air bag cushion to deploy through upon actuation of the SIR system. This separate door is designed to open in response to the force of the expanding air bag cushion. In other words as the pressure in the air bag cushion increases, a force is generated and as the air bag cushion deploys at this force, the door selectively separates from the remaining portion of the module and the instrument panel as the air bag cushion deploys.

Typically, the manufacture of the conventional instrument panel involves forming an opening in the instrument panel adjacent to the SIR system. This opening is then covered by a separate door, which is secured to the instrument panel and faces the occupants of the vehicle. Thus, the instrument panel itself is manufactured in view of the shape and size of the door and the door is separately manufactured and installed within the opening in the instrument panel.

Several drop-in-module systems employ a self adjusting cover used to improve the fit between the instrument panel and the passenger airbag cover, by allowing the module canister to self adjust and absorb any tolerance stack between the instrument panel and the air bag module assembly. Most non-self adjusting panel cover systems allow the tolerance stack to deteriorate the nominal fit between the panel cover and instrument panel, thus causing potential customer dissatisfaction of the interface between the cover and instrument panel.

Current self adjusting cover designs have a door cover size physically larger than a nonfloating door cover because the self adjusting cover incorporates "snap" features that extend beyond a periphery of the instrument panel opening. To ensure a good fit between the cover and instrument panel, several snap features are required. However, as the number of snap features increase, the installation and removal efforts of the cover increase.

Accordingly, it is desired to have a good fit between the cover and instrument panel that is aesthetically pleasing without increasing the installation and removal efforts, as well as the size, of the cover.

SUMMARY

A vehicle airbag system and method of removably securing the same is disclosed. The method and system include an instrument panel disposed within a passenger compartment of the vehicle having an opening to receive an airbag module and a cover removably secured thereto. The cover is configured to cover the opening and to flushly mount with a surface defining the instrument panel. A chute extends from a bottom surface of the cover and is configured to operably connect with the airbag module. A securement feature extends from one side wall defining the chute and is configured to slidingly engage one edge defining the opening of said instrument panel to mechanically wedge the one edge between the bottom surface of the cover and the securement feature. A plurality of apertures are configured in an opposite side of the cover that are configured to receive a mechanical fastener therethrough to secure the opposite side of the cover to the instrument panel.

The above-described and other features are appreciated and understood by those skilled in the art from the following detailed description, drawings, and appended claims.

DETAILED DESCRIPTION

Figure 1:
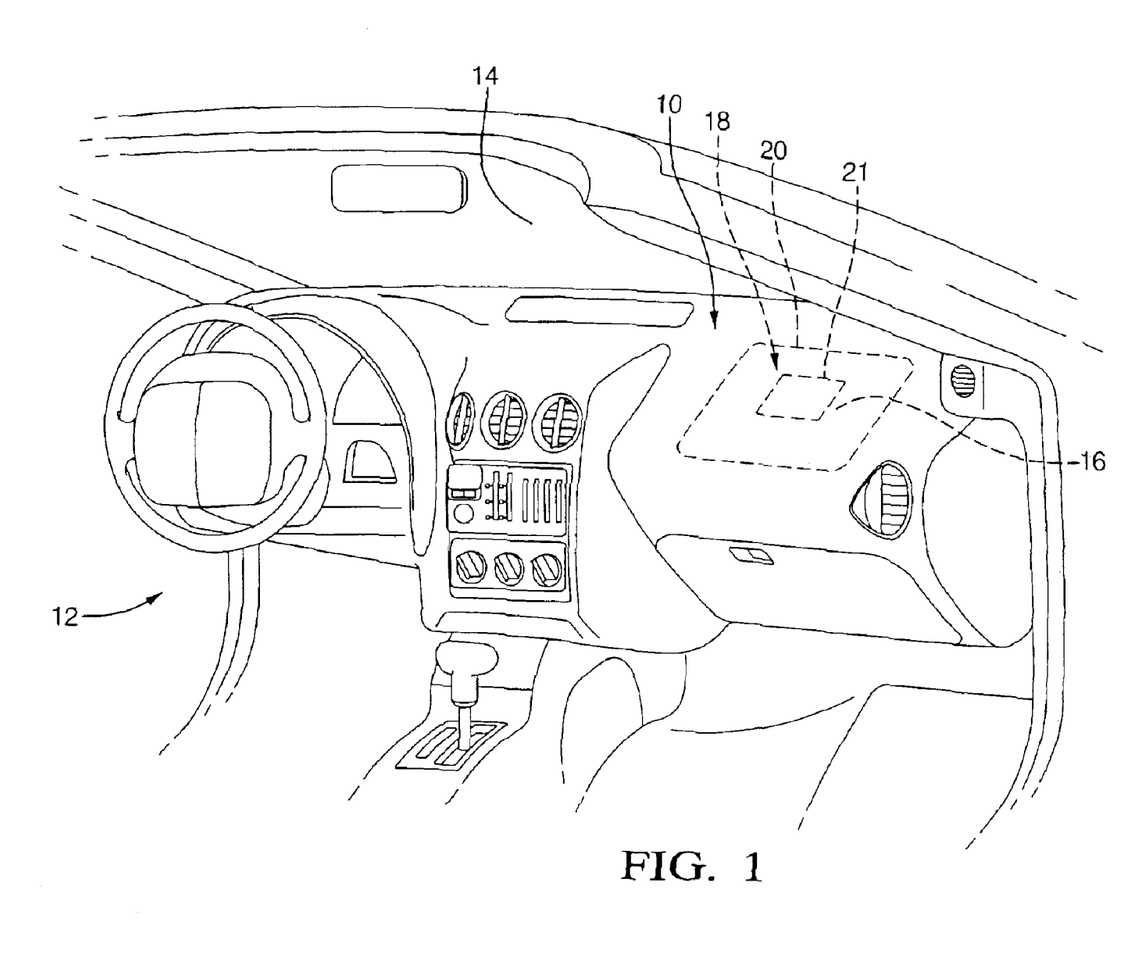
FIG. 1 is a perspective view of an exemplary vehicle instrument panel in accordance with the present disclosure.

Referring to FIG. 1, an instrument panel in accordance with the present disclosure is illustrated and generally indicated at 10. The instrument panel 10 is assembled into a vehicle passenger compartment 12 beneath a windshield 14 and extending across substantially the entire width of the passenger compartment 12. According to the present disclosure, and as will be described in greater detail herein, the instrument panel 10 includes an instrument panel cover 16 having a deployment region 18 formed therein, wherein the deployment region 18 is defined by an area 20 that extends through an opening to the interior of the panel 10. The deployment region 18 is intended to be the general area in which a passenger side SIR system (not shown) is proximately disposed thereto and deployed through during actuation thereof under predetermined deployment conditions. In an exemplary embodiment, the SIR system includes an airbag module 21 shown generally with phantom lines.

Figure 2:
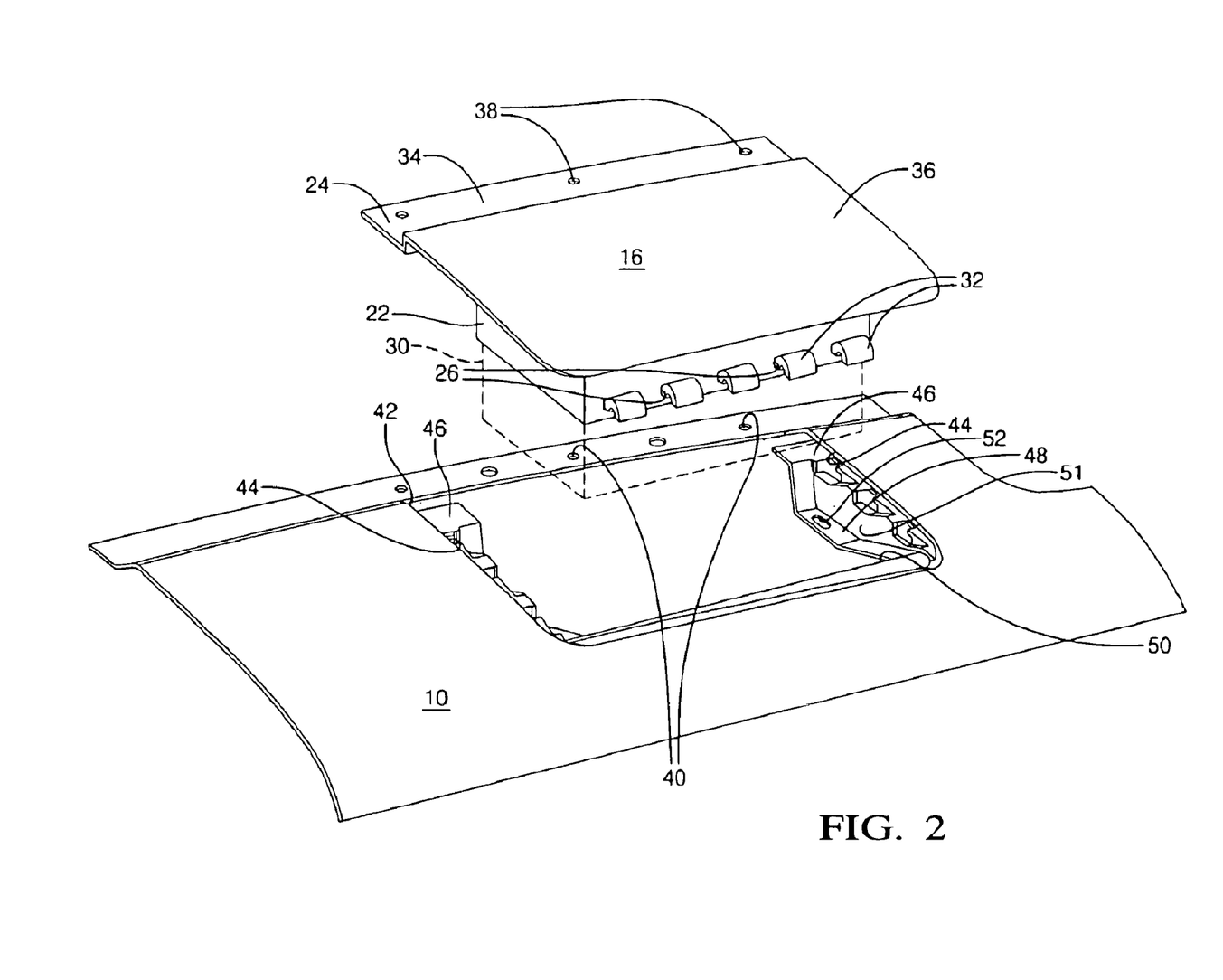
FIG. 2 is an opposite perspective view of FIG. 1 illustrating a passenger airbag cover and attached canister removed from the instrument panel.

FIG. 2 illustrates a perspective view of a passenger portion of one exemplary instrument panel 10. Instrument panel 10 is depicted with instrument panel cover 16 removed from panel 10. Instrument panel cover 16 includes a rectangularly shaped chute 22 depending from a bottom surface defining cover 16 and includes an offset or L-shaped flange 24 extending from one edge defining cover 16. Chute 22 includes apertures 26 disposed on a rearward side (shown) and an opposite side or forward side (not shown). A self adjusting airbag module housing 30 (shown with phantom lines) operably depends from chute 22 via securement means 32 extending from forward and rearward sides defining housing 30. Securement means 32 in one embodiment as illustrated in FIG. 2 include hook flanges 32 that are aligned to extend through corresponding apertures 26 and allow fore/aft and side-to-side movement of housing 30 relative to chute 22 in order to provide self adjustment when installing panel cover 16 to instrument panel 10. Hook flanges 32 may be integrally formed with housing 30.

Housing 30 is configured to receive and house components of the airbag module, such components are known to one skilled in the art and include but not are not limited to the following: an inflator for providing a means for inflating an inflatable cushion and a means for securing the inflator and the inflatable cushion within housing. Housing 30 is preferably configured to have a "U" shape with an opening positioned at the top for allowing the inflatable cushion to deploy therefrom. Of course, and as applications may require, housing 30 can be configured to have various other configurations. In an exemplary embodiment housing 30 is manufactured out of steel by an extrusion or stamping process. Of course, housing 30 can be manufactured out of other materials including but not limited to other types of metals (e.g. aluminum) and/or polymer materials (e.g. plastic) that will allow for the inclusion of the features which will be described in more detail below.

L-shaped flange 24 extending from a forward edge of cover 16 is defined by a top surface 34 that is lower than a top surface 36 defining cover 16. L-shaped flange 24 includes apertures 38 corresponding to apertures 40 in instrument panel 10 for fastening surface 34 to a forward portion of panel 10.

Figure 3:
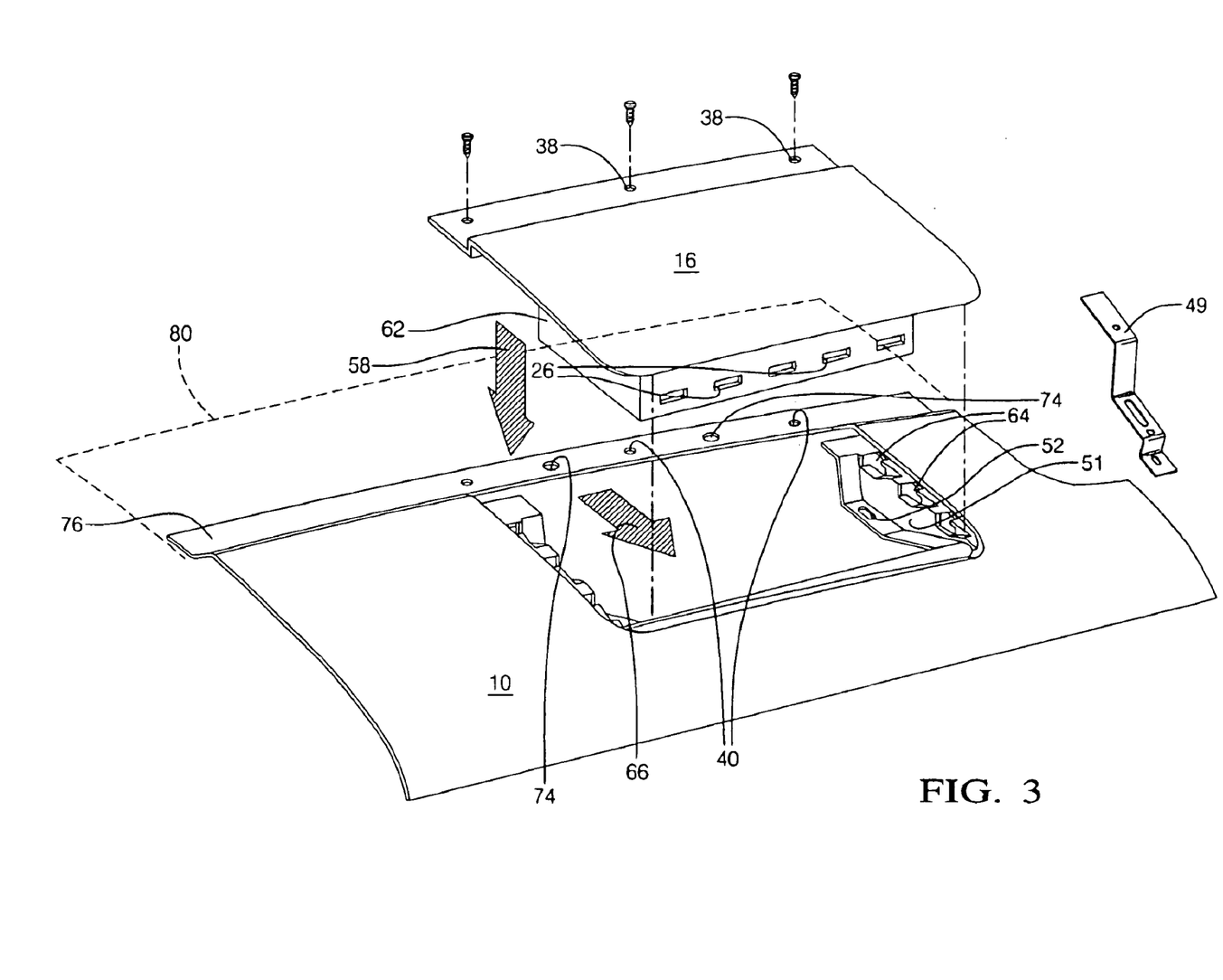
FIG. 3 is a perspective view of the passenger airbag cover of FIG. 2 without the canister illustrating installation with the instrument panel.

Instrument panel 10 includes an opening 42 configured therein for flushly mounting panel cover 16 such that surface 36 of cover 16 is substantially flush with an exterior surface defining panel 10. Extending into opening 42 proximate the forward edge from below two side edges 44 defining two opposite sides of opening 42 are a panel cover forward support 46 configured to support the forward bottom surface of panel cover 16 upon installation. An airbag module support 48 extends at one end from each support 46 and extends to a rearward edge 50 of instrument panel 10. A wall 51 preferably extends into opening 42 and is normal to a length defining support 48 extending from support 46 to rearward edge 50 of instrument panel 10. Each support 48 is configured to support a bottom portion of air bag module 21. Each airbag module support 48 includes an elongated slot 52 formed therein for receiving a fastener therethrough to fasten airbag module 21 to each support 48. A support bracket 49 illustrated in FIG. 3 is optionally disposed underneath support 48 to offer increased support or reinforcement and provide a mounting surface to fasten airbag module 21 thereto. Bracket 49 is mechanically fastened to support 48 using rivets, for example. Supports 46, 48 and wall 51 are preferably integrally formed with each other and with instrument panel 10, which is preferably molded. Instrument panel 10 is preferably injection molded and formed out of a material that is lightweight and easily molded (e.g., a polymer such as plastic).

Figure 4:
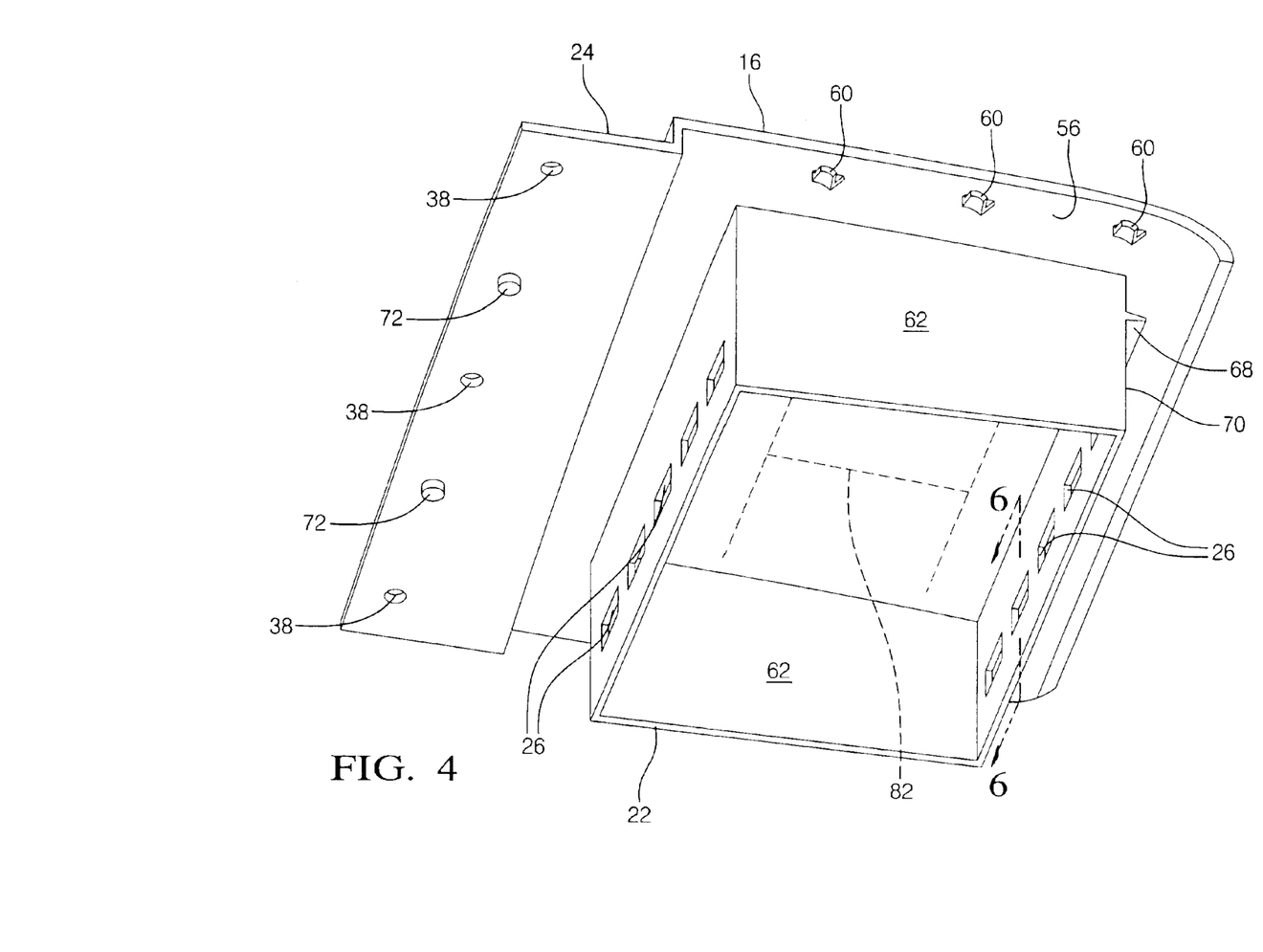
FIG. 4 is a bottom perspective view of the passenger airbag cover of FIG. 4.

Referring now to FIGS. 2–4, deployable panel cover 16 is positioned on top of housing 30 and allows for deployment of an inflatable cushion therethrough. Deployable panel cover 16 is formed out of a material that is lightweight and easily molded (e.g., a polymer such as plastic). Deployable cover 16 is formed out of a material having similar characteristics (e.g., color, texture, etc.) as the instrument panel. In accordance with an exemplary embodiment, airbag module 21 is secured within a vehicle by attaching housing 30 to each support 48, which may be reinforced with bracket 49, while cover 16 is removably secured to the vehicle. For example, cover 16 is flushly secured to the periphery of opening 42 of instrument panel 10 of the vehicle. In order to allow for a flush or continuous placement or mounting of deployable cover 16 within opening 42 defined in the instrument panel, deployable cover 16 is secured to housing 30 wherein housing 30 is capable of movement within a range in order to allow flush securement of cover 16 to the instrument panel. When housing 30 is capable of movement relative to cover 16, tolerance stack between the instrument panel and housing is limited, thus limiting deterioration of the nominal fit between panel cover 16 and instrument panel 10.

Exterior top surface 36 of cover 16 faces toward an occupant of the vehicle as well as forms a portion of the instrument panel surface. Chute 22 depends downwardly from an bottom surface 56 of cover 16. As described with reference to FIG. 2 above, chute 22 includes at least one aperture 26 or plurality of apertures 26 disposed in fore and aft portions of chute 22 configured to each receive securement means 32 of module 21. The configuration of apertures 26 and securement means 32 allows chute 22 and thus, cover 16 to move with respect to module 21. Bottom surface 56 further includes at least one side attachment means 60 disposed thereon for attachment proximate side edges 44 defining two sides of opening 42 of instrument panel 10. In an exemplary embodiment illustrated with respect to FIGS. 3 and 4, attachment means includes three latch hooks 60 depending from bottom surface 56 proximate each side 62 of chute 22 configured to be received in complementary formed receptacles 64 formed in instrument panel 10 to secure opposing sides of cover 16 with panel 10. In a preferred embodiment, attachment means 60 are configured to snappingly engage corresponding receptacles 64 when cover 16 is slid rearward during installation thereof. Alternatively, attachment means 60 are each configured to mechanically wedge with corresponding receptacles to provide a flush mount of cover 16 with instrument panel 10.

Still referring to FIGS. 3 and 4, cover 16 is first towered in a direction indicated by arrow 58 aligning attachment means 60 with an opening of a corresponding receptacle 64. Next, cover 16 is slid rearward indicated by arrow 66 to engage a securement feature 68 extending from a rearward facing wall 70 of chute 22 with rearward edge 50 of instrument panel 10. In an exemplary embodiment, securement feature 68 includes a lip 68 that extends from rearward facing wall 70 along a width defining the same to provide continuous securement along the rearward edge of cover 16. However, it will be recognized that lip 68 may include intermittent portions along a width of wall 70 of chute 22.

Figure 6:
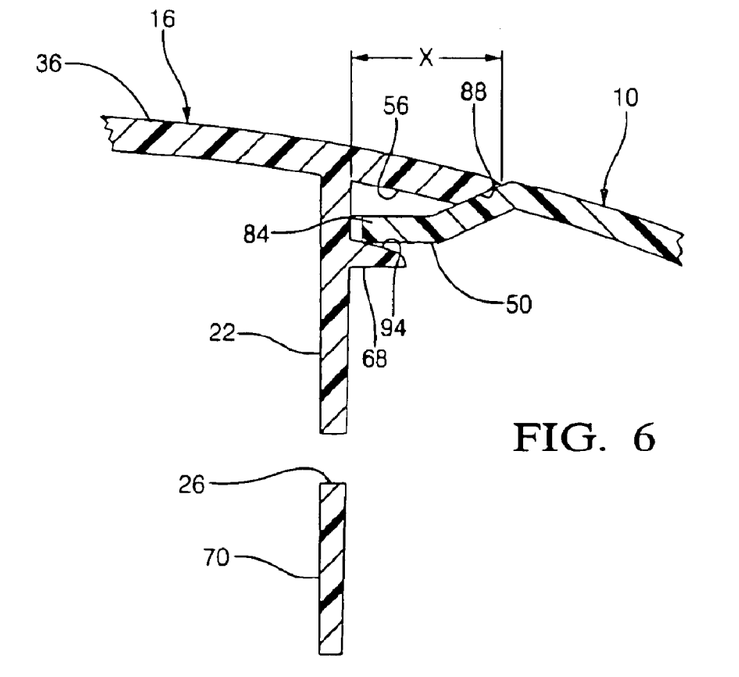
FIG. 6 is a partial cross sectional view of the passenger airbag cover along the lines 6—6 illustrating a rearward section thereof constructed in accordance with the present disclosure.

As cover 16 is slid rearward, positioning means 72 depending on a bottom surface of L-shaped flange 24 aids in fore/aft adjustment of cover 16 with respect to instrument panel 10 such that positioning means 72 ensures engagement of lip 68 along a substantial length thereof with rearward edge 50 of instrument panel 10. More specifically with respect to an exemplary embodiment depicted in FIGS. 3 and 4, positioning means 72 includes two fore/aft datums 72 configured to align with complementary shaped reliefs 74 formed in a forward lowered portion 76 of panel 10. As cover 16 is slid rearward, datums 72 are received in a corresponding relief 74 to indicate proper positioning of cover 16 with panel 10 and indicative of continuous locking engagement between lip 68 and rearward edge 50 of instrument panel 10 along a substantial length of lip 68 (see FIG.

6). Once cover 16 is slid rearward and datums 72 are properly positioned, fasteners (not shown), such as scrivets, and the like (e.g., mechanical fasteners) extend through apertures 38 of cover 16 and apertures 40 in portion 76 of panel 10 to secure cover 16 at a forward portion of panel 10. Next, a trim plate 80 shown with phantom lines in FIG. 3 may be flush mounted with panel 10 over lowered portion 24 to cover the mechanical fasteners used to secure cover 16 to panel 10 at the forward section. It will be noted that although an exemplary embodiment has been described with cover 16 being configured to be slid rearward during installation, it is contemplated that cover 16 and panel 10 may be configured to allow installation by sliding forward or to either side of the vehicle. Furthermore, cover 16 may be configured to allow opening of cover 16 having L-shaped portion 24 act as the hinge during an airbag deployment or have tear seams located in the interior surface of the cover as indicated by phantom lines 82 in FIG. 4. Once cover 16 is movably secured to panel 10 the airbag module is now secured in its preferred location (e.g. within a vehicle).

In an exemplary embodiment referring to FIG. 6, cover 16 is then removably secured to instrument panel 16 by mechanically wedging and engaging lip 68 and bottom surface 56 of cover 16 with rearward edge 50 of instrument panel 10. A forward lower portion 84 of rearward edge 50 wedges toward rearward facing wall 70 of chute 22 atop lip 68 while a rearward portion 88 of rearward edge 50 wedges against bottom surface 56 of a rearward portion of cover 16.

Figure 5:
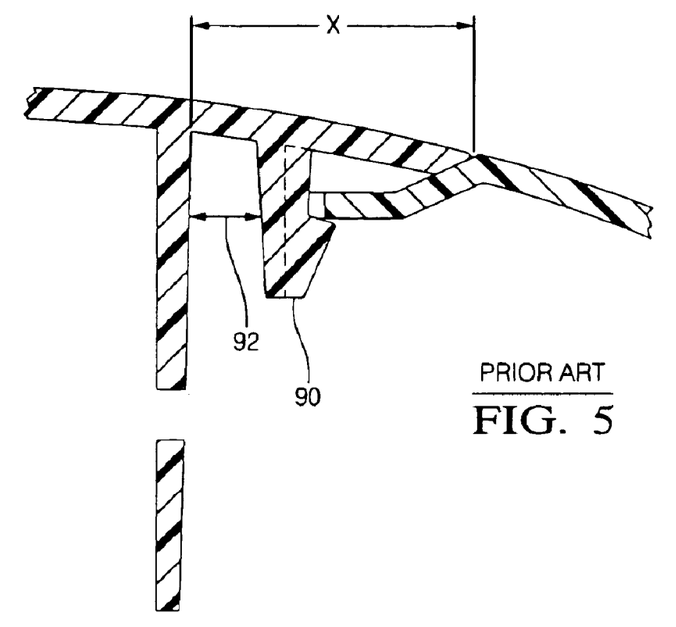
FIG. 5 is a partial cross sectional view of a conventional passenger airbag cover illustrating a rearward section thereof.

With reference now to FIGS. 5 and 6, it will be readily recognized by one skilled in the pertinent art that by having rearward edge 50 of instrument panel 10 abut chute 22, the portion of cover 16 extending rearward may be reduced by eliminating a resilient hook conventionally disposed some distance outside a periphery defining chute 22 in conventional panel cover arrangements. More specifically, FIG. 5 depicts a conventional resilient hook 90 extending from a bottom surface of a cover disposed some distance 92 outside a periphery defined by a chute depending from the bottom surface of the cover. Having resilient hook 90 at some distance 92 from the chute increases the distance X from a peripheral edge defining one edge of the cover to a rearward facing wall of the chute in FIG. 5 relative to the distance X in FIG. 6. The decreased distance X in FIG. 6 translates into a smaller cover 16 relative to a cover in FIG. 5. Having a decreased distance X between a peripheral edge defining an edge of cover 16 and one wall of chute 22 allows an air bag module to be disposed closer or farther away from a passenger occupant because the airbag module may be placed closer to the passenger occupant or the windshield, respectively, since a portion of cover 16 extending over at least one wall defining chute 22 may be made smaller. Likewise, the above cover configuration offers increased flexibility in placement along the cross car direction, as well. For example, this cover configuration offers placement of the air bag module closer to the passenger side door window if desired.

This means for securing cover 16 to instrument panel 10 still allows housing 30 to self adjust with respect to the structure in which it is placed which in turn allows for the exterior surface 36 of cover 16 to align or be flushly mounted with respect to the exterior surface of the instrument panel surface. For example, once housing 30 is fixedly secured to the vehicle, cover 16 is capable of movement along the three axes, which allow for variations in design and securement. In contrast, if cover 16 was fixedly secured to housing 30 (e.g., no additional movement or play available) and the instrument panel was positioned at a location further away than presented by the cover fixedly secured to the housing, there may be a non-uniform or non-flush securement to the instrument panel surface. One skilled in the pertinent art will also readily recognize that the above described means for securing cover 16 to instrument panel 10 is optionally employed in a non-floating or fixed airbag module arrangement and is not limited to "floating" arrangements.

In an exemplary embodiment referring to FIGS. 4 and 6, chute 22 having lip 68 is integrally molded with cover 16. In addition, lip 68 includes an angled or chamfered top surface 94 for engaging the periphery of opening 42 in order to mechanically wedge the periphery of opening 42 between chamfered top surface 94 and a periphery defining cover 16. This mechanical wedge engagement along the length of lip 68 ensures a continuous lock engagement between rearward edge of cover 16 with corresponding periphery of opening 42 while providing a flush mounting therebetween. This engagement is secured when positioning means 72 are properly disposed with corresponding reliefs 74 and then cover 16 is mechanically fastened at the opposite side via apertures 38 in cover 16 and apertures 40 in panel 10.

Figure 7:
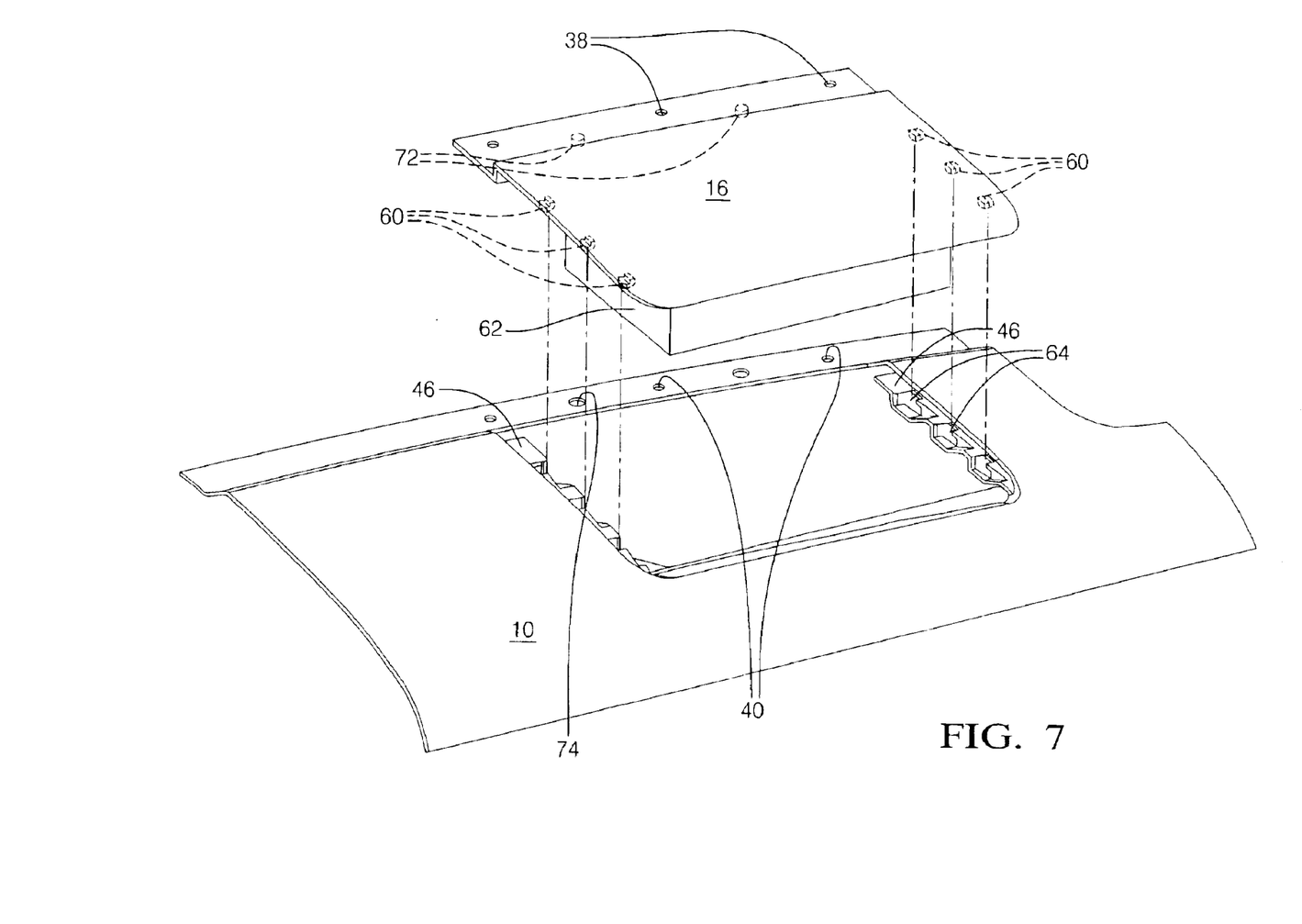
FIG. 7 is a perspective view of an alternative embodiment of the passenger airbag cover of FIG. 2 without integrally molded supports for installing the canister with the instrument panel.

An alternative exemplary embodiment of cover 16 and instrument panel 10 is illustrated in FIG. 7 whereby instrument panel 10 is configured without support 48 and wall 51 integrally molded therewith. In this embodiment, a floating or fixed airbag module arrangement may be employed. Assembly between cover 16 and panel 10 is as described with reference to FIGS. 2–4 and 6 without mounting airbag module 21 to support 48 which is absent therefrom.

The present disclosure relates to a passenger airbag door which allows the housing to self adjust with respect to tolerance stack relative to the structure in which it is received yet still allow flush mounting of the cover to which the housing is operably connected, but still remain securely attached during deployment. Features of the design are at least one hole on opposite sides of chute 22 molded into the forward and rearward walls of chute 22, securement means 32 extending from housing 30 which protrude through these holes allowing housing 30 to self adjust while allowing flush mounting of cover 16 with instrument panel 10. In a preferred embodiment illustrated in the Figures, a series of five apertures on opposing two sides of chute 22 are sized relative to the mating securement means 32 extending therethrough to allow the cover to move in the x, y and z directions once housing 30 is fixedly mounted within an interior of instrument panel 10. The amount of movement can be varied as required.

The present disclosure can be used with both self adjusting airbag modules and airbag modules fixed relative to the panel cover. In either case, the cover and panel interface described above greatly reduces installation and removal efforts while providing an effective locking system between the passenger airbag cover and the instrument panel and reduce the fore/aft width of the airbag cover when installed in this orientation.

While the invention has been described with reference to one or more an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A deployable door for an instrument panel, the instrument panel having an inner surface, an outer surface, and an opening, the deployable door comprising:
   a cover having a top surface and a bottom surface and a plurality of apertures extending therethrough proximate a first end of said cover, said cover further having a plurality of datums extending from said bottom surface of said cover proximate said first end of said cover, said cover configured to cover said opening of said instrument panel, said top surface of said cover being flushly mounted with respect to said outer surface of said instrument panel;
   a chute extending from said bottom surface of said cover, said chute configured to operably connect with an air bag module, said chute having first, second, third and fourth side walls defining a periphery of said chute; and
   a securement feature extending from said first side wall of said chute along substantially an entire width of said first side wall, said securement feature configured to engage one edge of the instrument panel defining said opening to mechanically wedge said one edge between said bottom surface of said cover and said securement feature, wherein said plurality of datums of said cover are configured to be received in complementary configured reliefs in said instrument panel to indicate a desired engagement position of said securement feature with said one edge of the instrument panel.

2. The deployable door of claim 1, further comprising a first plurality of attachment hooks that are disposed on said bottom surface of said cover proximate a second end of said cover and a second plurality of attachment hooks that are disposed on said bottom surface of said cover proximate a third end of said cover opposite said second end, said first and second plurality of attachment hooks being configured to be received in receptacles of said instrument panel.

3. The deployable door of claim 1, wherein a first portion of said top surface of said cover is lower than a second portion of said top surface of said cover, said plurality of apertures extending through said first portion of said cover.

4. The deployable door of claim 3, further comprising a trim plate configured to cover said first portion of said top surface and to be substantially flush with said second portion of said top surface.

5. The deployable door of claim 1, wherein said securement feature comprises a lip extending outwardly from said first side wall of said chute.

6. The deployable door of claim 5, wherein said lip comprises a chamfered top surface configured to engage a bottom surface of said one edge of said instrument panel opening while said bottom surface of said cover engages a top surface of said edge of said instrument panel.

7. The deployable door of claim 1, wherein said first side wall of said chute includes a first plurality of apertures extending therethrough, and said second wall of said chute opposite said first side wall includes a second plurality of apertures extending therethrough.

8. The deployable door of claim 7, further comprising a housing configured to hold said airbag module, said housing having a first plurality of hook flanges configured to be received in said first plurality of apertures of said chute, said housing further having a second plurality of hook flanges configured to be received in said second plurality of apertures of said chute.

9. The deployable door of claim 1, wherein said bottom surface of said cover includes a tear seam configured to tear during deployment of said airbag module.

10. The deployable door of claim 1, further comprising a plurality of mechanical fasteners configured to be received in said plurality of apertures extending through said cover to secure a portion of said cover to said instrument panel and allowing said cover to pivotally open during deployment of said airbag module.

11. A method to secure a deployable door to an instrument panel, the instrument panel having an inner surface and an outer surface and an opening, comprising:
   disposing said deployable door proximate said opening of said instrument panel, said deployable door having a cover, a chute, and a securement feature, said cover having a top surface, a bottom surface, a plurality of apertures extending through said cover proximate a first end of said cover, and a plurality of datums extending from said bottom surface of said cover proximate said first end of said cover, wherein said top surface of said cover is flushly mounted with respect to said outer surface of said instrument panel, said chute extending from said bottom surface of said cover and having first, second, third and fourth side walls defining a periphery of said chute, said securement feature extending from said first side wall of said chute substantially an entire width of said first side wall;
   disposing said securement feature proximate one edge of the instrument panel defining said opening of said instrument panel; and
   moving said deployable door in a first direction toward a first position to mechanically wedge said one edge between said bottom surface of said cover and said securement feature, wherein said plurality of datums of said cover are received in complementary configured reliefs in said instrument panel when said deployable door is disposed at said first position to prevent further movement of said deployable door in said first direction.

12. The method of claim 11, further comprising:
   moving a first plurality of attachment hooks that are disposed on said bottom surface of said cover at a second end of said cover and a second plurality of attachment hooks that are disposed on said bottom surface of said cover at a third end of said cover into corresponding receptacles of said instrument panel, said second end being opposite said third end.

13. The method of claim 11, further comprising affixing said deployable door to said instrument panel by disposing mechanical fasteners through said plurality of apertures in said cover into said instrument panel.

14. The method of claim 13, further comprising affixing a trim plate to said instrument panel such that said trim plate covers a portion of said top surface of said cover proximate said apertures.

15. An instrument panel for a vehicle, comprising:
   an outer surface having an opening; and
   a deployable door comprising a cover, a chute, and a securement feature, said cover having a top surface and a bottom surface and a plurality of apertures extending therethrough proximate a first end of said cover, said cover further having a plurality of datums extending from said bottom surface of said cover proximate said first end of said cover, said cover configured to cover said opening of said outer surface, said top surface of said cover being flushly mounted with respect to said outer surface, said chute extending from said bottom surface of said cover, said chute having at least a first side wall, said securement feature extending from said first side wall of said chute, said securement feature configured to engage one edge of said outer surface defining said opening to mechanically wedge said one edge between said bottom surface of said cover and said securement feature, wherein said plurality of datums of said cover are configured to be received in complementary configured reliefs in said outer surface to indicate a desired engagement position of said securement feature with said one edge of said outer surface.

16. A method for assembling an instrument panel for a vehicle, comprising:

providing an instrument panel with an outer surface and an inner surface, said instrument panel having an opening;

disposing a deployable door proximate said opening of said instrument panel, said deployable door having a cover, a chute, and a securement feature, said cover having a top surface, a bottom surface, a plurality of apertures extending through said cover proximate a first end of said cover, and a plurality of datums extending from said bottom surface of said cover proximate said first end of said cover, wherein said top surface of said cover is flushly mounted with respect to said outer surface, said chute extending from said bottom surface of said cover having at least a first side wall, said securement feature extending from said first side wall of said chute;

disposing said securement feature proximate one edge of said outer surface defining said opening; and moving said deployable door in a first direction toward a first position to mechanically wedge said one edge between said bottom surface of said cover and said securement feature, wherein said plurality of datums of said cover are received in complementary configured reliefs of said instrument panel when said deployable door is disposed at said first position to prevent further movement of said deployable door in said first direction.

* * * * *